Feb. 18, 1936.  K. G. V. NILSSON  2,031,571
SEALED BEARING
Filed July 6, 1935  2 Sheets-Sheet 1

INVENTOR.
Karl Gustav Valentin Nilsson
BY
*Chas. Lyon Russell*
his ATTORNEY.

Feb. 18, 1936.    K. G. V. NILSSON    2,031,571
SEALED BEARING
Filed July 6, 1935    2 Sheets-Sheet 2
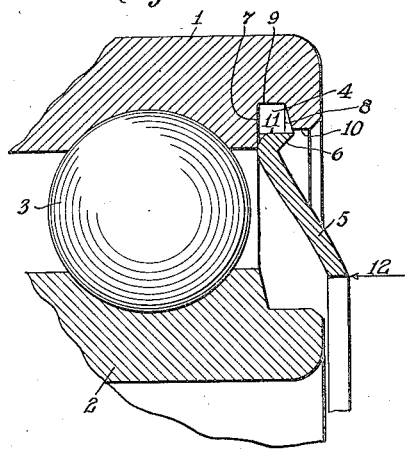
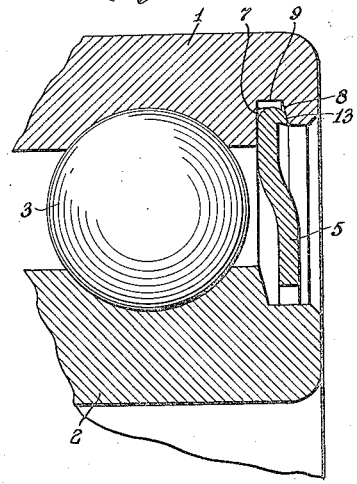
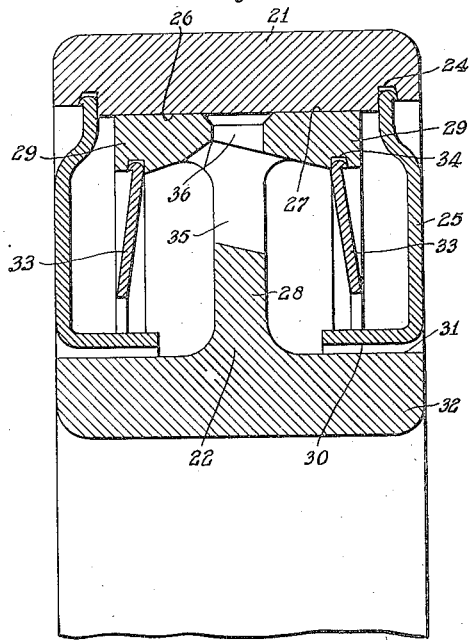
INVENTOR.
Karl Gustav Valentin Nilsson Patented Feb. 18, 1936

2,031,571

UNITED STATES PATENT OFFICE 2,031,571

SEALED BEARING

Karl Gustav Valentin Nilsson, Goteborg, Sweden, assignor to Aktiebolaget Svenska Kullagerfabriken, Goteborg, Sweden, a corporation of Sweden Application July 6, 1935, Serial No. 30,051
In France April 11, 1935

6 Claims. (Cl. 308—187)

My invention relates to improvements in sealed bearings and has for an object to provide a method so fixing the closure member in a bearing ring that the external or internal dimensions of the bearings will not be altered during the fixing operation.

The present invention relates to separating members in bearings and particularly to sealed bearings of the type in which a plate or guard is fixed to one of the bearing members and is in sealing relation to the other bearing member, in order to provide a closure for preventing the entrance of dust to the bearing or leakage of lubricant from the bearing. The invention is particularly applicable to anti-friction bearings. It may however, also be used in connection with plain bearings, particularly plain bearings of the type in which the outer and inner members form a unit of the dimensions standardized for ball and roller bearings, in order to enable plain bearings to be used alternatively with ball and roller bearings as the occasion demands.

Sealed bearings, of anti-friction type, as at present in use, commonly have a peripheral groove formed in the outer race ring of the bearing laterally of the race-way into which an annular plate or closure member is inserted. The closure member is held rigidly in the outer race ring, and its inner periphery is brought into proximity to the inner race ring, thereby forming a seal. In order to securely fix the closure member in the outer race ring, it is customary to expand the former in some manner, until its outer periphery engages the bottom of the groove. This is usually done by cupping the closure member and, after locating it in the proper position with respect to the outer race ring, the closure member is flattened out whereby it expands into the groove. This method of fixing often causes considerable trouble because of the difficulty in controlling the forces with which the sealing plate engages the bottom of the groove. It often happens that the closure member exerts such a pressure on the outer race ring of the bearing that the latter is also expanded in the vicinity of the groove. As anti-friction bearings are made to very close tolerances and the closure member is inserted after the manufacture and assembly of the bearing have been completed, the result will be that the outer diameter of the outer race ring of the bearing will be oversize at at least a part of the width of the bearing.

The purpose of the present invention is to provide a method of fixing the closure member, whereby the external or internal dimensions of the bearings will not be altered during the fixing operation.

The form of closure member according to the invention and the method of applying the same is illustrated in the accompanying drawings in which Fig. 1 shows a section through a ball bearing having a closure member of the general type of the invention.

Fig. 5 shows on a larger scale the first operation in applying a closure member, according to the invention, to the ball bearing of Fig. 1.

Fig. 6 shows the closure member in position in the bearing, and

Fig. 7 shows a plain bearing having members according to the invention.

Figure 1:
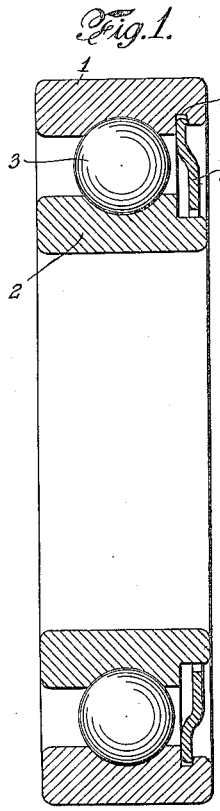
Figure 2:
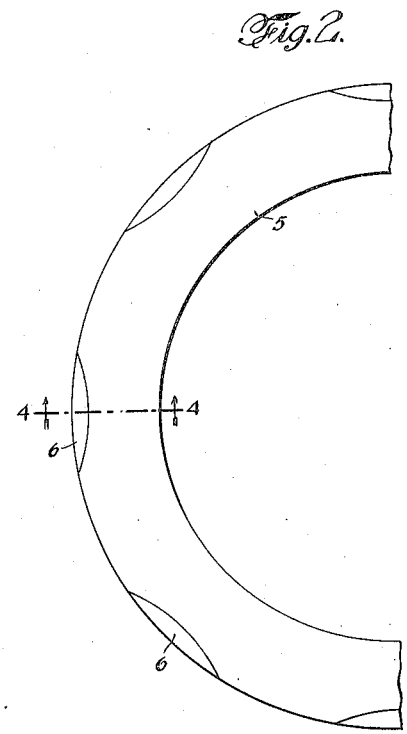
Fig. 2 shows a side view of one half of the closure member shown in Fig. 1.
Figure 4:
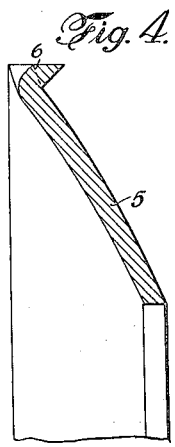
Fig. 4 shows on a larger scale a section along the line indicated by the arrows 4—4 in Fig. 2.
Figure 3:
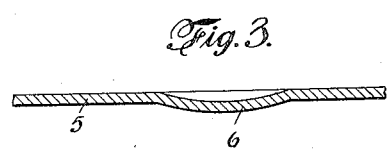
Fig. 3 shows a portion of the edge or outer periphery of the same closure member.

In Fig. 1 the ball bearing comprises an outer race ring 1, an inner race ring 2 and a series of balls 3 therebetween. Formed in the internal surface of the outer race ring laterally of the balls is a groove 4 in which is inserted a closure member 5, the inner periphery of this member being in sealing relation with respect to the inner race ring 2. At intervals around the outer periphery of the closure member 5 are formed a number of bulges or claw members 6. These claw members are formed by bending the edge of the closure member 5 sideways for a short distance, thereby forming a series of bulges.

The method of inserting the closure member is illustrated in Figs. 5 and 6. The groove 4 has a plane side face 7, a conical side face 8 and a substantially cylindrical bottom surface 9. That part of the cylindrical inner surface of the outer race ring of the bearing outside of the groove 4 has a greater diameter 10 than that part of the outer race ring inside of the groove. The side face 8 of the groove 4 is slightly conical, the angle between the side faces 7 and 8 being about five degrees. The sealing member 5 is cupped, and its outer diameter 11 is slightly smaller than the inner diameter 10 of the outer race ring. The width of the closure member measured across the bulges is slightly greater than the width of the groove 4 at its mouth. When assembling the closure member 5 it is inserted into the outer race ring and rests against the side face 7 of the groove 4. Pressure is now brought to bear against the closure member in the direction of the arrow 12 in Fig. 5. This pressure tends to flatten out the closure member 5 and at the same time increase its external diameter 11. The outer periphery of the closure member 5 is thereby forced up into the groove 4. Since the width of the member 5 measured over the bulges 6 is greater than the width of the groove, the edges of the bulges are turned over as shown at 13 in Fig. 6, thereby wedging the closure member between the side faces 7 and 8 of the groove 4. As is apparent from Fig. 6 the outer periphery 11 of the member 5 is not expanded to such an extent that it comes into contact with the bottom 9 of the groove. There is therefore no tendency for the closure member to expand the outer ring of the bearing diametrically. It is instead held by friction between the walls 7 and 8 as though it were caulked in.

Fig. 7 shows the invention applied to a plain bearing. In this bearing the outer bearing member 21 has an internal sliding surface 26 cooperating with an external sliding surface 27 on the inner bearing member 22. The inner bearing member 22 has an I-section being provided with a web 28 and flanges 29. Side plates or sealing members 25 are inserted in grooves 24 in the outer bearing member 21 in a manner similar to that described in connection with Figs. 5 and 6. The sealing members 25 have axially extending cylindrical portions 30 which together with the cylindrical surface 31 of the inner flanges 32 of the inner bearing member 22 form a seal.

The bearing illustrated in Fig. 7 is intended for grease lubrication and is provided with separating plates 33 fixed in the flanges 29 of the inner bearing member. The separating members 33 are inserted in grooves 34 in the manner described above. It is important that the outer sliding surfaces 27 of the inner bearing member should not be expanded, when the plates 33 are inserted, whereby the proper clearance or play between the inner and the outer bearing members would be destroyed.

In operation the spaces between the sealing member 25, the outer bearing member 21 and the inner flanges 32 of the inner bearing member 22 are filled with grease. When the bearing is put into operation, the inner bearing member rotates and grease is thrown out through holes 35 formed in the web 28 of the inner bearing member and from there through radial passages 36 to the sliding surfaces. From the sliding surfaces it works its way out under the pressure of the load past the edges of the flanges 29 into the spaces between the members 33 and 25, thereby displacing grease already in these spaces and causing some of this grease to pass through the annular opening between the member 33 and the cylindrical part 30 of the sealing plate 25 into the annular chamber contained between the two members 33. The function of these members 33 is to form a rotating lubricant chamber, whereby the action of the centrifugal forces acting on the lubricant will be increased, thereby creating a more satisfactory lubrication of the bearing.

Having thus described my invention, I claim and desire to secure by Letters Patent:

1. An anti-friction bearing comprising an outer race ring, an inner race ring and rolling elements between the said race rings, there being a peripheral groove in the internal surface of the outer race ring laterally of the raceway, the said groove being wider at its mouth than at the bottom, and a closure member located in the groove, the said closure member being frictionally held between the side walls of the groove, free of the bottom of the groove.

2. An anti-friction bearing comprising an outer race ring, an inner race ring and rolling elements between the said race rings, there being a peripheral groove in the internal surface of the outer race ring laterally of the raceway, one side wall of said groove being plane and the other tapering, and a closure member located in the groove, the said closure member being frictionally held between the side walls of the groove, free of the bottom of the groove.

3. An anti-friction bearing comprising an outer race ring, an inner race ring and rolling elements between the said race rings, there being a peripheral groove in the internal surface of the outer race ring laterally of the raceway, the said groove being wider at its mouth than at the bottom, and a closure member located in the groove, the said closure member having local protuberances at its outer periphery, the total width of the closure member being greater than the width of the bottom of the groove, whereby the said closure is frictionally held between the side walls of the groove, free of the bottom of the groove.

4. An anti-friction bearing comprising an outer race ring, an inner race ring and rolling elements between the said race rings, there being a peripheral groove in the internal surface of the outer race ring laterally of the raceway and a closure member located in the groove, the said closure member having claw members at intervals at its outer periphery, the width of the closure member with claw members being greater than the width of the mouth of the groove, the claw members being adapted to be bent over upon entrance of the closure member into the groove, whereby the said closure member may be frictionally held between the side walls of the groove, free of the bottom of the groove.

5. A closure for bearings comprising an annular cupped member of sheet material having claw members projecting sideways from the body of the closure member at intervals about its outer periphery, the claw members being adapted to be bent over upon entrance of the outer edge of the closure member into a groove, whereby the closure member may be frictionally held between the side walls of the groove, free of the bottom of the groove.

6. An anti-friction bearing comprising an outer race ring, an inner race ring and rolling elements between the said race rings, there being a peripheral groove in the internal surface of the outer race ring laterally of the raceway, said groove having a bottom surface, a substantially plane side face and a conical side face, and a closure member located in the groove, the said closure member having claw members at intervals at its outer periphery, the width of the closure member with claw members being greater than the width of the mouth of the groove, the claw members being adapted to be bent over and wedged against the conical side face of the groove upon entrance of the closure member into the groove, whereby the said closure member may be frictionally held between the side walls of the groove, free of the bottom of the groove.

KARL GUSTAV VALENTIN NILSSON.